US010768405B2

(12) United States Patent
Schacht et al.

(10) Patent No.: US 10,768,405 B2
(45) Date of Patent: Sep. 8, 2020

(54) MICROSCOPE HAVING AN OBJECTIVE-EXCHANGING DEVICE

(71) Applicant: CARL ZEISS MICROSCOPY GMBH, Jena (DE)

(72) Inventors: Peter Schacht, Erfurt (DE); Hubert Wahl, Stadtroda (DE); Nils Langholz, Apolda (DE); Tobias Hackel, Eisenach (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 32 days.

(21) Appl. No.: 15/772,024

(22) PCT Filed: Oct. 25, 2016

(86) PCT No.: PCT/EP2016/075611
§ 371 (c)(1),
(2) Date: Apr. 27, 2018

(87) PCT Pub. No.: WO2017/072094
PCT Pub. Date: May 4, 2017

(65) Prior Publication Data
US 2018/0231759 A1 Aug. 16, 2018

(30) Foreign Application Priority Data
Oct. 28, 2015 (DE) .......................... 10 2015 221 040

(51) Int. Cl.
*G02B 21/24* (2006.01)
(52) U.S. Cl.
CPC .................................. *G02B 21/248* (2013.01)
(58) Field of Classification Search
None
See application file for complete search history.

(56) References Cited

U.S. PATENT DOCUMENTS 3,488,109 A 1/1970 Sperlich
4,515,439 A * 5/1985 Esswein .................. G02B 7/14
359/381

(Continued)

FOREIGN PATENT DOCUMENTS

DE 10031720 A1 1/2002
DE 112004000341 T5 4/2006

(Continued)

OTHER PUBLICATIONS

English Translation of International Search Report for PCT Application PCT/EP2016/075611, dated Jan. 2, 2017, 2 pages.

(Continued)

*Primary Examiner* — Derek S. Chapel
(74) *Attorney, Agent, or Firm* — Brake Hughes Bellermann LLP

(57) ABSTRACT

The invention relates to a microscope (12) having an objective interchange apparatus (22) comprising a holder (21) for receiving a number of objectives (1) at respective holder positions (21.*n*) and an objective receptacle (11) which is configured for receiving an objective (1) and is arranged in an optical beam path (13) of the microscope (12). The microscope (12) is characterized by an objective delivery device (20) which is configured for transporting in each case a selected objective (1) having an objective retainer (3) between its holder position (21.*n*), which is delivered to a transfer position (ÜP), and the objective receptacle (11), wherein the objective receptacle (11) remains in the optical beam path (13) during the transport of the objective (1). The objective retainer (3) has an outer centering diameter (10) as a reference surface, which diameter is guided against a lateral reference surface located in the objective receptacle (11) such that a reproducible positioning perpendicular to an optical axis (4) of the microscope (12) may be achieved.

15 Claims, 7 Drawing Sheets

(56) References Cited

U.S. PATENT DOCUMENTS

| | | | |
|---|---|---|---|
| 6,400,501 B2 * | 6/2002 | Tsuchiya | G02B 7/16 |
| | | | 359/368 |
| 6,636,352 B2 | 10/2003 | Engelhardt | |
| 7,327,514 B2 | 2/2008 | Uhl et al. | |
| 8,553,322 B2 | 10/2013 | Niv et al. | |
| 8,553,323 B2 | 10/2013 | Gilbert et al. | |
| 8,559,119 B2 * | 10/2013 | Seifert | G02B 21/241 |
| | | | 359/381 |
| 2014/0015953 A1 * | 1/2014 | Turgeman | G02B 21/16 |
| | | | 348/79 |

FOREIGN PATENT DOCUMENTS

| | | |
|---|---|---|
| DE | 102007058341 A1 | 6/2009 |
| DE | 102009044413 A1 | 5/2010 |
| DE | 102009029146 A1 | 12/2010 |
| EP | 1168027 A1 | 1/2002 |
| EP | 2827181 A2 | 1/2015 |
| WO | 2012097191 A2 | 7/2012 |

OTHER PUBLICATIONS

German Search Report for International Application 102015221040.5, dated May 6, 2016, 8 pages.

International Preliminary Report on Patentability for Application No. PCT/EP2016/075611, dated May 11, 2018, 10 pages.

\* cited by examiner

MICROSCOPE HAVING AN OBJECTIVE-EXCHANGING DEVICE

CROSS REFERENCE TO RELATED APPLICATIONS

This application is a 35 U.S.C. § 371 National Phase Entry Application from PCT/EP2015/075611, filed Oct. 25, 2016, designating the United States and claiming priority to German Application No. 10 2015 221 040.5, filed Oct. 28, 2015, the disclosures of which are both incorporated herein by reference in their entireties.

TECHNICAL FIELD

This disclosure relates to a microscope having an objective interchange apparatus.

BACKGROUND

To permit recording and analysis of structures of varying size using imaging methods, microscopes are equipped with various objectives that can be inserted, for example by being pivoted, into the optical beam path of the microscope, depending on the desired magnification.

If objectives are to be interchanged frequently, a plurality of objectives can be arranged in a holder, which permits fast and repeatable access to a selected objective and which allows for an objective interchange to be performed efficiently.

In what are known as revolvers, by way of example, a selected objective may be pivoted into the optical beam path of the microscope by rotating the holder about an axis of rotation. Focusing is achieved by way of setting a distance between the objective and a sample to be examined by displacing the holder having the objective or displacing the sample.

When it is displaced, the mass of the holder and of the objectives attached thereto causes high mechanical preloading of the drive train or the objective drive used for focusing, which disadvantageously helps bring about what are known as stick-slip effects, which occur in particular in guides and gears that are based on friction. In order to reduce disadvantageous mass-induced effects, complicated and therefore costly principles and constructive solutions must be implemented. In addition, relatively high drive capacities are required and the dynamic parameters of the output are unfavorable, which in turn has a negative impact on the positioning accuracy of the objective.

A high mass of the holder and of the drive train furthermore causes low natural frequencies and consequently high oscillation amplitudes at constant excitation energy. These have a negative impact on the resolution and the accuracy of the microscope in the case of great magnifications.

In addition, the eccentric centroid of the holder, in particular of the revolver, leads to additional and changing mechanical loads of the drive train. By way of example, due to the differing masses of the individual objectives, interchanging an objective results in a displacement of the centroid and causes a changed load situation as compared to the initial state before the objective was interchanged, which likewise has a negative effect on obtaining the image section and on the precision of the displacement motion.

International Application WO 2012/097191 A2 discloses a microscope that has an objective interchange apparatus having a holder for receiving a number of objectives at respective holder positions. When necessary, a selected objective is positionable in an optical beam path of the microscope in an objective receptacle that is configured for receiving and retaining the objective in a scanning unit. To this end, a scanning unit is displaced, together with the objective receptacle, to a specific holder position so as to lift the objective, which is located at the relevant holder position, with the objective receptacle from the holder and to connect it to the objective receptacle using a magnetic coupling. In addition, the objective is fixed at the objective receptacle by way of a locking mechanism based on movable balls.

After the objective is received, the scanning unit is displaced horizontally until the selected objective is situated in the optical beam path of the microscope. Disadvantageous here is the complicated horizontal displacement motion of the scanning unit and the necessary orientation of the scanning unit in the optical beam path of the microscope, which must be renewed for each objective interchange.

SUMMARY

Implementations described herein are based on the object of specifying a microscope in which an objective interchange is made possible and in which the disadvantages known from the prior art are at least reduced.

In some implementations, a microscope includes an objective interchange apparatus having a holder for receiving a number of objectives at respective holder positions and an objective receptacle that is configured for receiving an objective and that is arranged in an optical beam path of the microscope. In some implementations, an objective delivery device is configured for transporting, in each case, a selected objective having an objective retainer between its holder position, which is delivered to a transfer position, and the objective receptacle, where the objective receptacle remains in the optical beam path of the microscope during the transport of the objective. The objective retainer can have an outer centering diameter as a reference surface, where the diameter is guided, or may be guided, against a lateral reference surface located in the objective receptacle such that a reproducible positioning perpendicular to an optical axis of the microscope is achieved or may be achieved.

The objective delivery device is a component of the objective interchange apparatus and allows the transport of the selected objective between the holder position and the objective receptacle, with the result that the objectives of the microscope can be interchanged and at the same time the number of the objectives contained in the holder are held, decoupled from the objective receptacle, for use.

The objective receptacle can remain in the optical beam path of the microscope, in particular, during the transport of the objective between the holder position and the objective receptacle. Due to the unchanged position of the objective receptacle, any renewed orientation or adjustment of the objective receptacle after an objective is interchanged is advantageously avoided. In particular, no renewed orientation or adjustment of the objective receptacle in an XY-plane, which extends substantially orthogonally with respect to the optical beam path, is necessary.

Focusing of the microscope is performed by changing the distance between the objective that is held in the objective receptacle in a use position and an object plane in a Z-direction.

The optical beam path of the microscope is understood to mean the optical axis thereof, irrespective of whether light rays in fact pass through the microscope at a specific time. The optical axis of the microscope, and below also the optical axis of the objective, is understood to mean the theoretical progression of a central ray, by way of which it is possible in a simplified manner to illustrate a beam path of light rays traveling through the microscope or through the objective.

In some implementations, during the focusing operation and any other motion of the objective receptacle in the Z-direction, only at most one objective is held at the objective receptacle. The other objectives held for a possible objective interchange can be located in the holder. By way of the drive train, in particular an objective drive for producing a movement of the objective receptacle in the Z-direction, a low mass therefore needs to be accelerated and decelerated, as a result of which stick-slip effects are reduced and the dynamic properties of the objective drive and of the microscope and the precision of the delivery movements of the objective drive are improved. In addition, due to the low mass, less energy is required for accelerating and decelerating the objective receptacle and the further components of the microscope which are moved for focusing purposes, as a result of which the mechanical load thereof is reduced. The lower mass of the objective drive additionally causes a higher natural frequency thereof, as a result of which the oscillation amplitudes at the same excitation energy are reduced. As compared to objective drives having a higher mass, this results in lower dynamically-caused deviations of the displacement movements, which improves the image resolution of the microscope over the time of a recording, for example, of a scan.

The objectives have an objective retainer which is, for example, molded onto a housing of the respective objective, for example, formed during a machining of the housing, or is attached thereto, for example, plugged in, screwed in and/or adhesively bonded thereto.

In further embodiments, the objective can be, by way of its housing, for example, screwed, pressed or adhesively bonded into/to an in particular plate-type objective retainer.

Where a transport of the objective or of the objective receptacle is mentioned in simplified terms below, this also includes the transport of the objective receptacle or of the objective.

In a possible embodiment, the objective retainer can have a coupling region for the releasable positive and/or non-positive and/or magnetic connection of the coupling region to a driver that engages at the coupling region. The coupling region can be configured such that the driver engages in and/or at the objective retainer.

By way of example, the coupling region can be configured as a groove in a microscope-side lateral face and/or in an object-side lateral face, said groove at least regionally surrounding the objective retainer.

The microscope-side lateral face of an objective retainer located in the objective receptacle faces away from an object plane of the microscope, while the object-side lateral face faces toward the object plane.

The objective retainer serves for retaining the objective, for example during the transport between the holder position and the objective receptacle. In addition, lateral faces of the objective retainer serve for forming reference surfaces and reference positions, or they serve as guide surfaces during the transport of the objective.

In a possible embodiment of the microscope, the objective retainer can have at least one planar support surface that extends substantially orthogonally with respect to an optical axis of the objective, wherein "substantially orthogonally" comprises deviations of a few degrees, for example up to 45 degrees.

By way of example, in a possible embodiment of the microscope, the microscope-side lateral face of the objective retainer can be entirely or partially configured in the form of a support surface. The support surface is produced with particular precision, such that it permits or supports referencing of the orientation of the objective in the optical beam path.

The support surface serves for resting flat against a correspondingly formed abutment surface of the objective receptacle. The abutment surface and the support surface that rests flat against it form a reference surface, to which reference is made (reference position), for example, during focusing of the objective by control-technological means in order to ascertain or set a current position of the objective in the Z-direction.

The support surfaces, which are configured orthogonally with respect to the optical axis of the objective, and the planar embodiment of the objective retainer allow a simple and efficient production and machining of the objective retainer.

The object-side lateral face serves for example as a sliding or guide surface of the objective retainer.

A functional separation of the microscope-side lateral face as the support surface and reference surface and the object-side lateral face as the sliding or guide surface advantageously permits transport of the objective retainer with no, or only very low, wear of the precisely produced support surface of the microscope-side lateral face and the repeated usability thereof for forming the reference surface. The objective retainer slides at least on sections of the object-side lateral face, wherein the wear thereof has no disadvantageous effect on the function of the microscope-side lateral face as the reference surface.

In inverted stands, the setup at the XY-plane should be considered in mirrored fashion. The object-side lateral face then no longer fulfils a function and the microscope-side lateral face must be split into guide surface and reference surface. The guide surface advantageously permits transport of the objective retainer with no or only very low wear of the precisely produced reference surface.

In possible embodiments, the microscope can be provided with a stand that is configured as an upright or inverted stand.

In further embodiments, the microscope has a stand by way of which the objective is held and/or guidable in deviation from an orthogonal orientation with respect to the object plane.

In further embodiments, a section of an object-side surface of the objective retainer can be configured as an objective support surface against which the objective that is retained in the objective retainer rests by way of a collar of its objective housing and on which a further reference surface is formed.

In further embodiments of the microscope, the objective retainer can be equipped with electrical contacts 33, as a result of which use of adaptive optical units, detection elements and/or other electrical and/or electronic components as the objectives is made possible.

In order to transport the objective between the holder position and the objective receptacle, the objective delivery device can have a driver. The driver can be configured such that the objective and/or the objective retainer is capable of being contacted thereby in a non-positive and/or positive fashion and/or by magnetic force so as to connect the driver to the objective and/or to the objective retainer, preferably releasably, non-positively and/or positively and in order to transport the objective in a controlled fashion between the holder position and the objective receptacle.

A driver is, for example, an arm that is displaceable or adjustable horizontally and optionally additionally vertically and has a hook, a claw or a differently shaped protrusion.

The objective retainer can have an outer centering diameter as a reference surface. The driver is used or may be used to pull the objective with said reference surface against lateral reference surfaces in the clamping apparatus. As a result, reproducible positioning perpendicular with respect to the optical axis of the microscope is attainable.

In order to retain the objective in the use position in the objective retainer in a spatially fixed manner, the microscope in one possible embodiment can have a clamping apparatus. The objective retainer permits, for example, focusing movements of the microscope, during which the objective receptacle is displaced in the Z-direction, without in the process changing a position and orientation of the objective relative to the objective receptacle. In the use position, an optical axis of the objective coincides with the optical beam path of the microscope, and the actual positioning and orientation of the objective is fixed by way of it resting against the at least one support surface which acts as a reference surface.

In a possible embodiment, the objective receptacle can include the support surface as a reference surface of the objective receptacle and at least one clamping element of the clamping apparatus. The objective retainer can be clamped or clampable, by way of its support surface, against the abutment surface using the clamping element. If a plurality of support surfaces are formed, the support surfaces of the objective retainer can be clamped or clampable in each case against one abutment surface.

In a possible further embodiment of the clamping apparatus, the clamping element is connected to a clamping element drive and is movable thereby in the Z-direction. The clamping element drive can be used to move the clamping element in the Z-direction in a controlled manner between an open position and a clamping position of the clamping element. In the open position, the clamping element is located at such a distance from the abutment surface that the objective retainer is arranged with play between the clamping element and the abutment surface, or the objective retainer can be introduced or removed between the clamping element and the abutment surface without the need to overcome a clamping force.

In the clamping position, the clamping element is located closer to the abutment surface such that the objective retainer is held by a clamping force acting between the clamping element and the abutment surface. Clamping the objective retainer can result in better dynamic coupling to the microscope than would be the case for example using magnetic coupling. The stiffness of the coupling to the microscope likewise can be advantageously increased by way of the clamping of the objective retainer.

In further embodiments, the function of the clamping element drive can be fulfilled by an objective drive that is configured for producing a movement of at least the objective receptacle in the Z-direction.

The holder can be arranged, for example, at a housing and/or at a carrying structure of the microscope, for example, at a frame or stand of the microscope, and can be configured to be movable such that the holder positions thereof are deliverable to a transfer position. The holder is here arranged above an object plane so as to permit objective interchange without negatively affecting a sample that is situated in the object plane.

If a holder position is delivered to the transfer position, a transport of the objective located at the relevant holder position to the object receptacle or the transport of an objective located at the object receptacle to the relevant holder position is made possible. To this end, the driver can be connected to the coupling region and, as a result of a controlled movement of the driver, the transport of the objective can result. After transport is complete, in particular after transport of the objective from the objective receptacle to the holder position is complete, the driver is decoupled or may be decoupled from the coupling region.

The holder can have a different configuration and in one possible embodiment can be a movably arranged series holder, the holder positions of which are deliverable to at least one transfer position.

In a further possible embodiment of the holder, it can be configured as a movably arranged revolver. A rotation-symmetric holder such as a revolver can permit short delivery paths of the objectives to the transfer position. In addition, precise guides for transporting the objectives, which are producible only with high costs, are largely or entirely avoided. The embodiment of the holder as a rotation-symmetric holder, such as a revolver, advantageously permits a compact construction of the objective interchange apparatus and the cost-effective manufacturing thereof.

In order to keep the objectives contained in the holder out of the image region of the microscope and/or in order to enable the largest possible freedom of movement of the microscope in the region of the objective, the holder in possible embodiments of the microscope can be configured to be rotatable about an axis of rotation that is inclined with respect to the optical beam path of the microscope. If the axis of rotation is inclined by a corresponding magnitude, the microscope according to the invention can be used to permit large displacement regions of the samples and to thus examine large samples with the microscope.

The microscope according to the invention can have a wide variety of objectives and can be configured in the form of a microscope selected from the entire field of microscopy. The microscope can be configured, for example, for widefield microscopy, confocal microscopy, laser scanning microscopy and light sheet microscopy. In further embodiments, the microscope can be equipped with an interferometer, in particular with a white light interferometer. The objective interchange apparatus can also be combined with an interferometer, in particular with a white light interferometer.

BRIEF DESCRIPTION OF THE DRAWINGS

Implementations are explained in more detail below on the basis of exemplary embodiments and figures, where.

DETAILED DESCRIPTION

Figure 1:
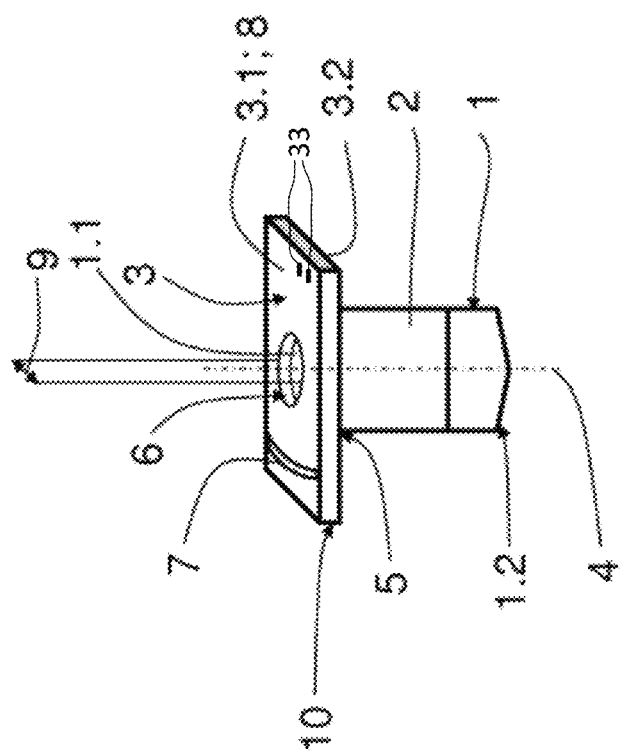
FIG. 1 shows a schematic illustration of an exemplary embodiment of an objective having an objective retainer.

FIG. 1 illustrates an exemplary embodiment of an objective 1 having an objective retainer 3. The objective 1 has an objective housing 2, a first end 1.1 of which is screwed into an objective retainer 3 such that a second end 1.2 of the objective 1 protrudes on one side from an object-side lateral face 3.2 of the objective retainer 3 that faces downwardly in the illustration.

In inverse microscopes 12, the entire setup should be considered rotated about the horizontal.

The objective retainer 3 has a microscope-side lateral face 3.1 and the object-side lateral face 3.2 that is parallel thereto, wherein a normal of the object-side lateral face 3.2 extends toward the second end 1.2 of the objective 1 and parallel with respect to the optical axis 4 of the objective 1.

A section of the object-side lateral face 3.2 is configured in the form of an objective support surface 5, against which the objective 1 rests by way of a collar of the objective housing 2 (which is not illustrated further). The objective support surface 5 and the adjoining collar provide a reference surface 6 of the objective 1. The geometric configuration of the objective retainer 3 permits simple manufacture with respect to the parallelism of the lateral faces 3.1 and 3.2 and a high concentricity of the objective support surface 5 and the collar and thus the precise formation of the reference surface 6.

Formed in the microscope-side lateral face 3.1 is a coupling region 7 in the form of a schematically illustrated groove. The optical axis 4 of the objective 1 is sectionally surrounded by the coupling region 7.

In addition to the coupling region 7, yet not overlapping it, a section of the microscope-side lateral face 3.1 is configured in the form of a support surface 8.

The objective retainer 3 has an inner centering diameter 9 for centering the objective 1 with respect to the objective retainer 3 and an outer centering diameter 10 for centering the objective retainer 3 in an object receptacle 11 (see FIGS. 2 to 5).

In further embodiments of the microscope 12, DIC sliders (DIC=digital interference contrast) can be integrated or may be integrated in the objective retainers 3.

Figure 2:
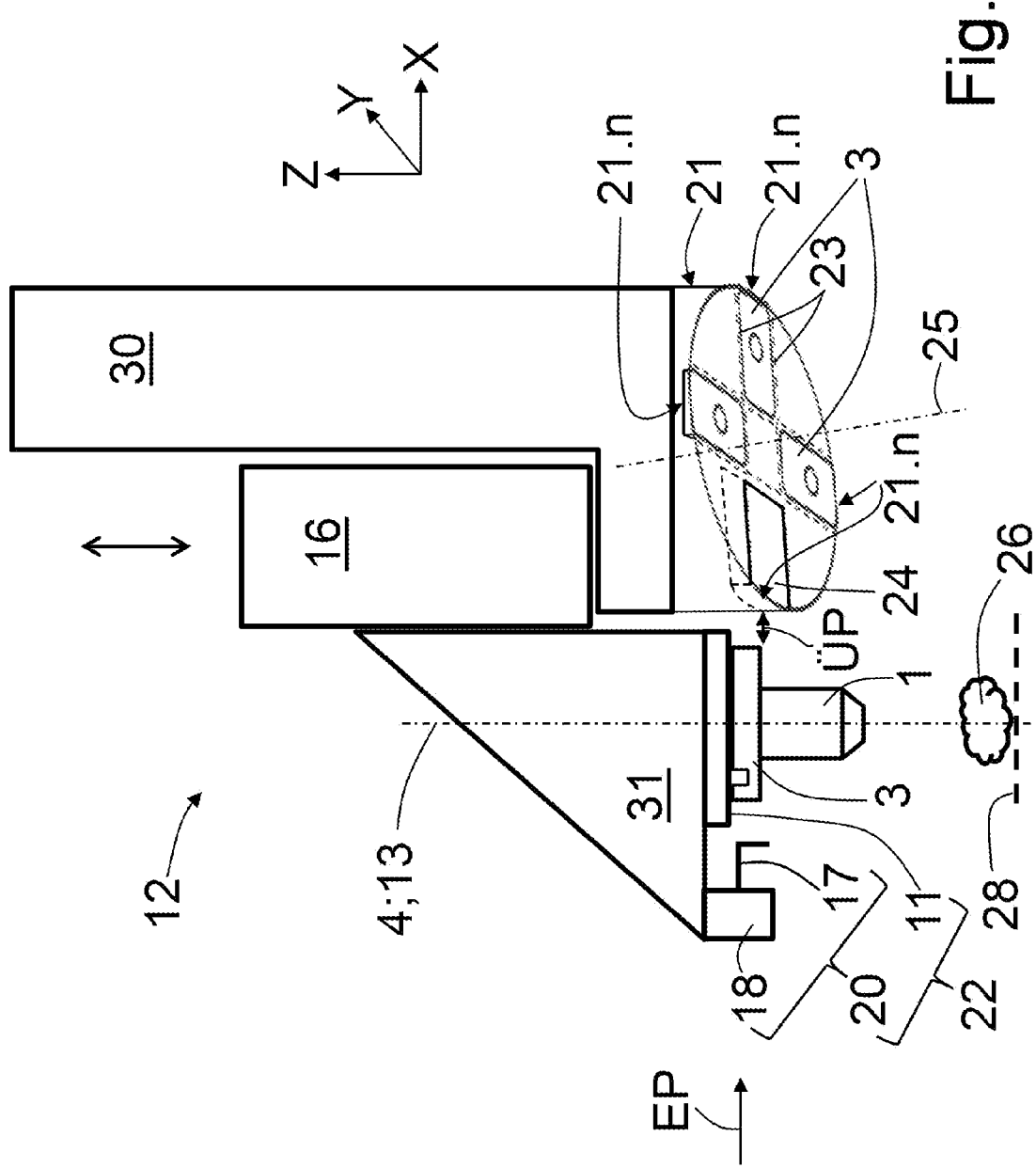
FIG. 2 shows a schematic illustration of a first exemplary embodiment of a microscope according to the invention.

A first exemplary embodiment of the microscope 12 is illustrated in FIG. 2 schematically and merely in part for reasons of clarity. The microscope 12 has an objective receptacle 11 having a free cross section through which extends an optical axis of the microscope 12, here referred to as the optical beam path 13. An objective 1 is retained in the objective receptacle 11 by way of its objective retainer 3. The objective 1 is situated at a use position EP, which is illustrated symbolically by a horizontal arrow, and is arranged in the optical beam path 13 such that the optical axis 4 of the objective 1 coincides with the optical beam path 13, with the result that the microscope 12 is operational.

A direction along the optical beam path 13 is referred to as the Z-direction Z, while an X-direction X and a Y-direction Y are each defined orthogonally with respect to the Z-direction Z and to each other. The directions X, Y, Z mentioned here are represented by the axes of a Cartesian coordinate system.

The microscope 12 is provided with an objective drive 16 for producing a controlled displacement motion of the objective receptacle 11, which is arranged at a carrier 31, in the Z-direction Z. The objective receptacle 11 is connected to the objective drive 16 via a connecting element 31. The objective drive 16 can have coarse and fine drives or be formed thereby.

The microscope 12 furthermore has a driver 17 and a driver drive 18 for the controlled production of a movement of the driver 17, in particular, in an XY-plane XY.

Held in a holder 21, configured in the form of a revolver, are a number of objectives 1, although for reasons of clarity the illustration shows in the holder 21 only the objective retainers 3 of the objectives 1 which are held therein. The holder 21 and the objective drive 16 are movably connected to a stand 30 of the microscope 12 and retained thereby.

Each objective 1 is held by way of its objective retainer 3 at a holder position 21.$n$ of the holder 21. Each of the objective retainers 3 is inserted into a U-shaped slide-in means 24 of the holder 21, said slide-in means 24 being provided with two opposite guides 23 which are schematically indicated in the illustration by dashed lines, wherein each slide-in means 24 defines one holder position 21.$n$. The holder 21 is mounted rotatably about an axis of rotation 25, which is inclined with respect to the optical beam path 13. In each case one of the holder positions 21.$n$ may be delivered to a transfer position ÜP, at which a substantially horizontal transport of an objective 1 between the holder position 21.$n$, which is delivered to the transfer position ÜP, and the objective receptacle 11 is possible.

The holder positions 21.$n$ that are situated outside the transfer position ÜP at a time are moved out of the XY-plane XY, in which the horizontal transport of the objective 1 takes place or can take place, due to the inclined axis of rotation 25. The objectives 1 that are not situated at the transfer position ÜP are therefore pivoted away from a sample 26 that is to be investigated using the microscope 12 and is located in an object plane 28, which is advantageous in particular in the case of complexly structured samples 26 and/or in the case of regions of the sample 26 that are difficult to access.

Figure 7:
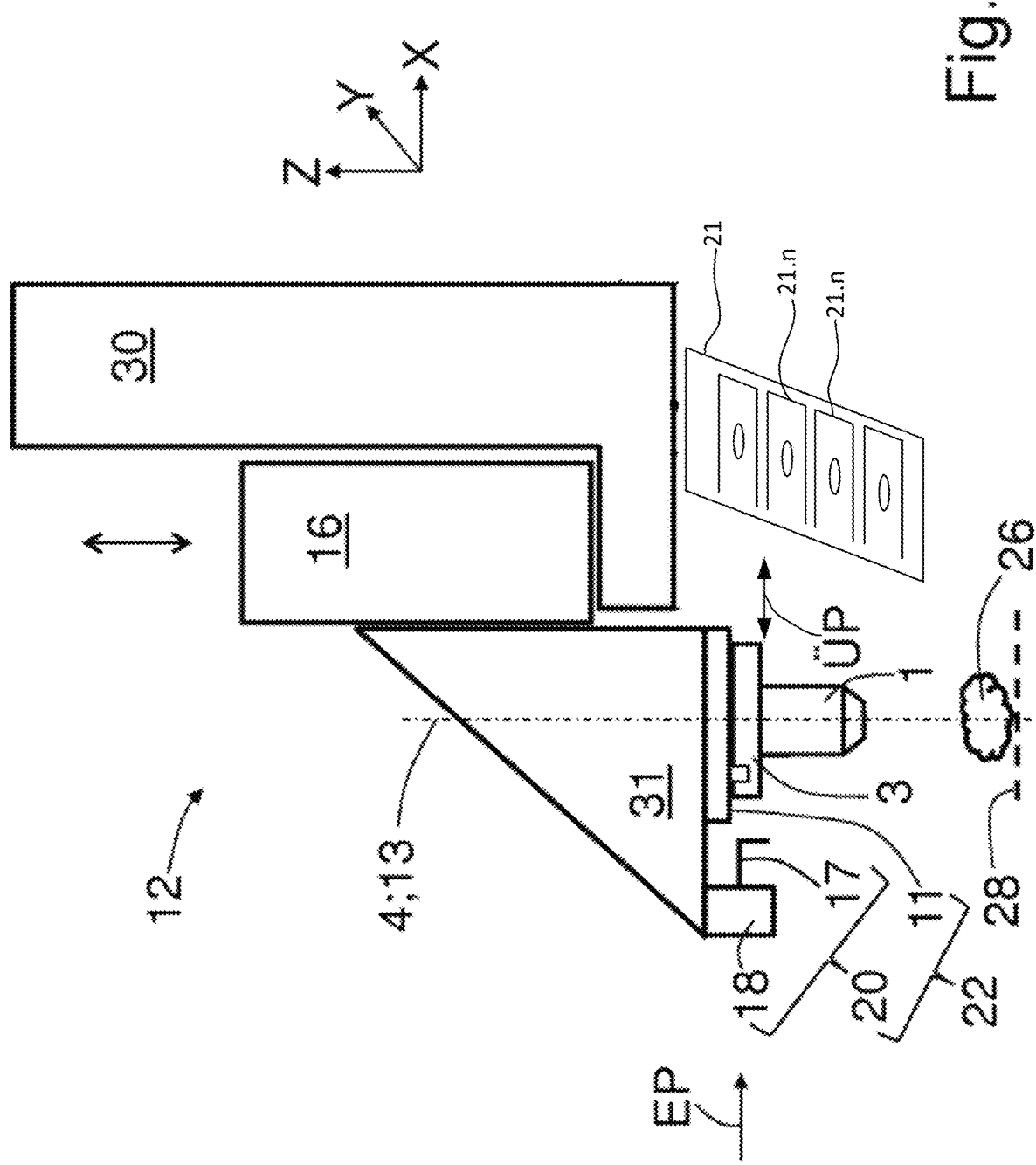
FIG. 7 shows a schematic illustration of another exemplary embodiment of a microscope according to the invention.

As shown in FIG. 7, if the holder 21 is configured in further embodiments as a series holder, the latter is movable by way of translation such that the holder positions 21.$n$ thereof may be delivered to the transfer position UP.

The holder positions 21.$n$ in further possible embodiments of the microscope 12 are arranged vertically one above the other.

In further embodiments of the microscope 12, the delivery of the holder positions 21.$n$ can be performed manually. In that case, the holder 21 is advantageously provided with a locking mechanism.

To avoid collisions for the case that objectives 1 are situated both in the object receptacle 11 and in the holder position 21.$n$ that is currently delivered to the transfer position ÜP, sensors (not illustrated) for capturing the presence of an objective 1 and/or a mechanically effective locking mechanism is/are optionally provided.

The driver 17 and the driver drive 18 represent essential components of an objective delivery device 20 of the microscope 12.

An objective interchange apparatus 22 of the microscope 12 is formed by the objective delivery device 20, the objective receptacle 11 and the holder 21.

Figure 3:
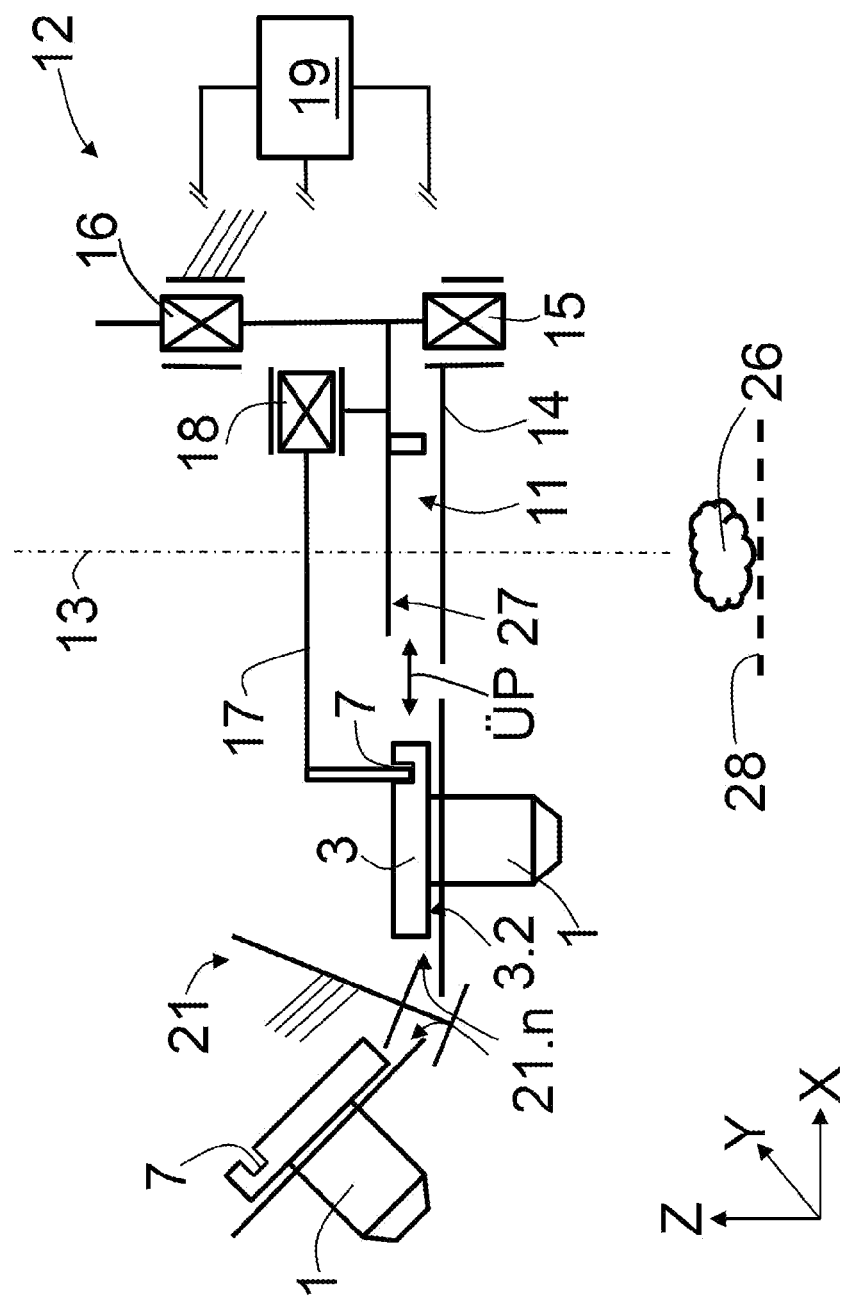
FIG. 3 shows a schematic illustration of a second exemplary embodiment of a microscope according to the invention in a first operating state.
Figure 4:
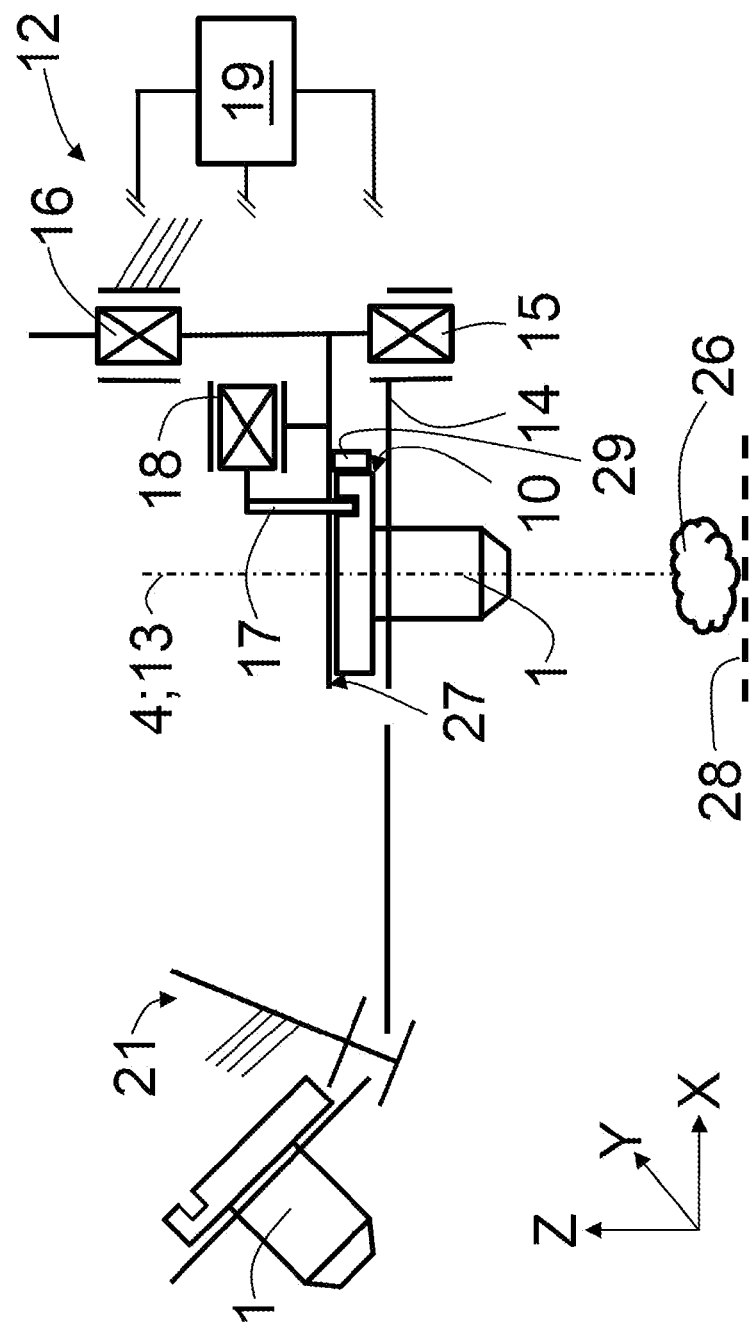
FIG. 4 shows a schematic illustration of the first exemplary embodiment of a microscope according to the invention in a second operating state.
Figure 5:
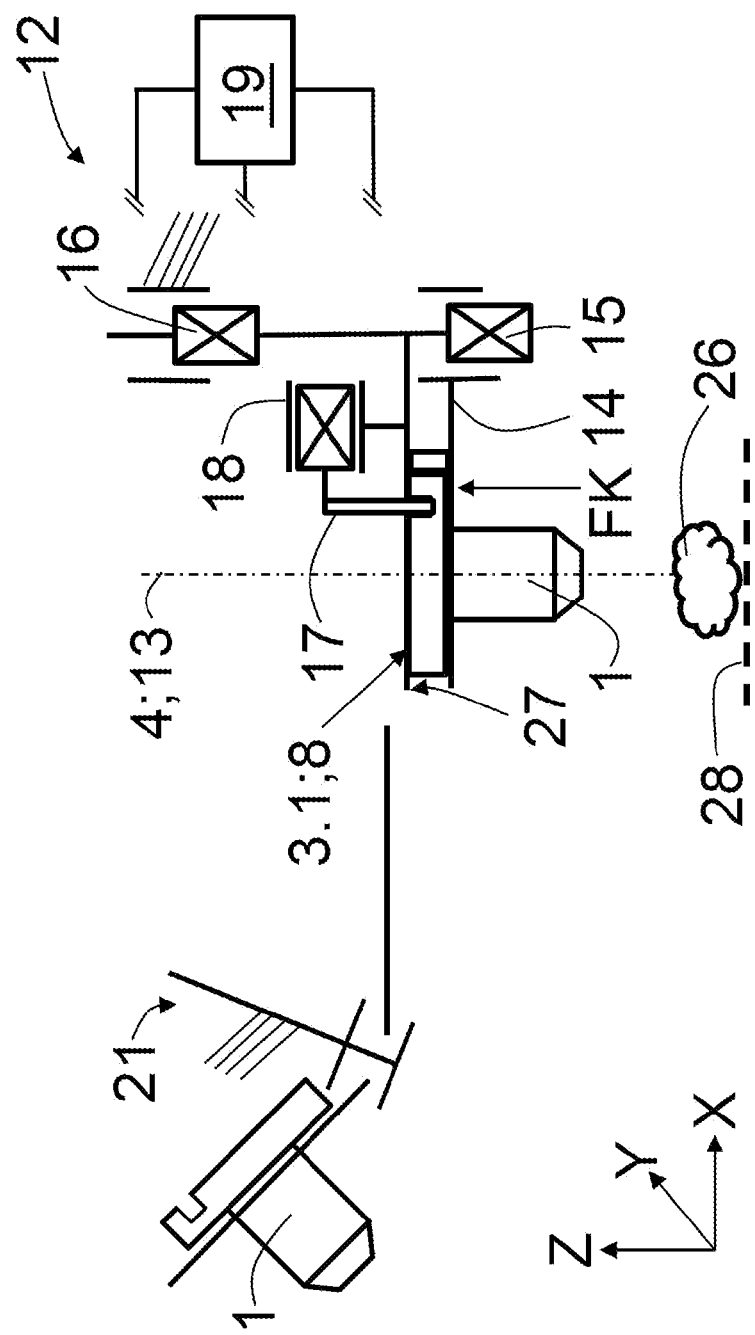
FIG. 5 shows a schematic illustration of the first exemplary embodiment of a microscope according to the invention in a third operating state.

With reference to FIGS. 3 to 5, successive operating states of a second exemplary embodiment of the microscope 12 are illustrated schematically below.

The objective receptacle 11 has a clamping element 14, in the form of a clamping jaw, and an abutment surface 27 at a wall or a bar of the objective receptacle 11. To produce a controlled movement of the clamping element 14 in the Z-direction Z, the clamping element 14 is connected to a clamping element drive 15 and is movable thereby.

The clamping element drive 15, the objective drive 16 and the driver drive 18 are connected to a control unit 19, by way of which they are actuated or may be actuated, for example, in terms of the time point, time duration, direction and amount of the effected movements.

Owing to the clamping element drive 15, the objective drive 16, the driver drive 18 and the control unit 19, the objective interchange and clamping and/or releasing the objective retainer 3 may be performed in largely automated fashion, as a result of which easy operability of the microscope 12 is ensured and the risk of operating errors is reduced.

FIG. 3 illustrates the holder 21, which is delivered, by way of one of its holder positions 21.n at which an objective 1 is held by its objective retainer 3, to the transfer position ÜP. At a further holder position 21.n, a further objective 1 with objective retainer 3 is illustrated, which is pivoted out of the XY-plane XY due to the inclined axis of rotation 25.

The objective receptacle 11 is displaced in the Z-direction Z using the objective drive 16 and is situated at the height of the transfer position ÜP, which is fixed by the arrangement and dimensions of the holder 21 above the object plane 28. Fixing the transfer position ÜP above the object plane 28 allows an objective interchange without the sample 26 being negatively affected.

The driver 17 is displaced in the XY-plane XY using the driver drive 18, which is actuated by the control unit 19, such that the driver 17 positively engages in the coupling region 7.

The driver 17 and the driver drive 18 in the illustrated exemplary embodiment are arranged so as to be displaceable in the Z-direction Z with the objective drive 16.

In further possible embodiments of the microscope 12, the driver 17 and the driver drive 18 are attached to the stand 30 or to a housing of the microscope 12.

The objective retainer 3 having the objective 1 may be transported horizontally to the objective receptacle 11 by way of the driver drive 18 being switched on by the control unit 19 by way of a control command, wherein the objective 1 slides on the object-side lateral face 3.2 during transport. The clamping element 14 is situated at an open position such that the objective retainer 3 may be transported into the objective receptacle 11 and between the clamping element 14 and abutment surface 27, without a clamping force FK (see FIG. 5) being acted on the objective retainer 3 by the clamping element 14.

In a second operating state of the microscope 12, which is schematically illustrated in FIG. 4, the objective 1 has been drawn into the objective receptacle 11 by way of the driver 17 in the XY-plane XY.

The objective 1 is guided with the outer centering diameter 10 against two stops 29 arranged in the object receptacle 3 and retained there. The outer centering diameter 10 is here orientable in the XY-plane XY with respect to the inner centering diameter 9 (see FIG. 1) such that, if possible, optimum concentricity of the two centering diameters 9, 10 is achieved. The orientation of the centering diameters 9, 10 is here attained by cooperation of a precisely manufactured abutment surface 27 and the microscope-side lateral face 3.1 and also the stops 29 and the outer centering diameter 10.

In a third operating state of the microscope 12, illustrated in FIG. 5, the objective receptacle 3, which is located in the objective receptacle 11, is guided by way of its microscope-side lateral face 3.1, which is formed as a support surface 8, against the abutment surface 27 using the clamping element 14 and is retained there by a clamping force FK which is effected using the clamping element drive 15 which is actuated by the control unit 19.

The objective receptacle 11 with the objective receptacle 3 that is clamped therein is displaced by the objective drive 16 in the Z-direction Z along the optical beam path 13 onto the object plane 28 for the purpose of focusing the microscope 12.

Figure 6:
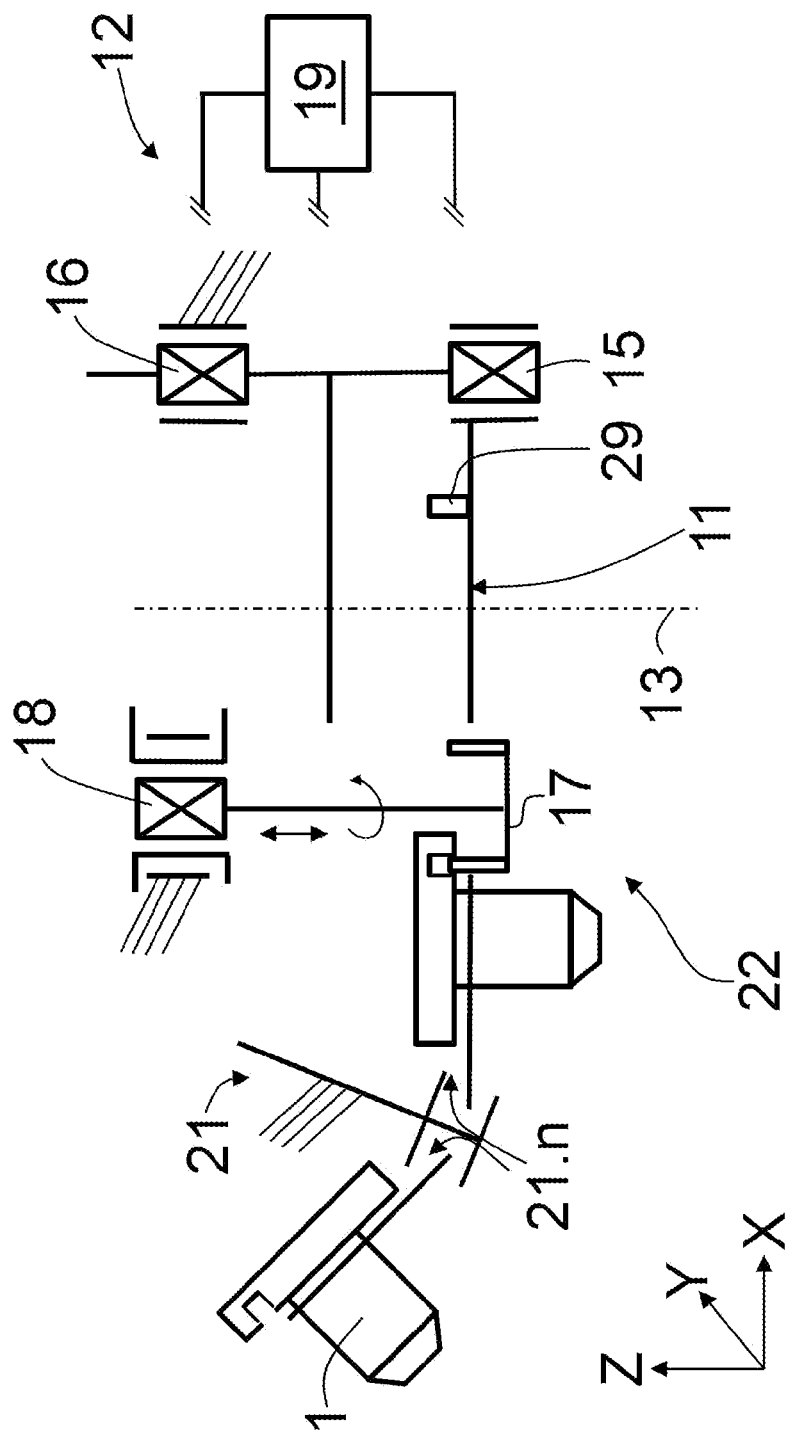
FIG. 6 shows a schematic illustration of a third exemplary embodiment of a microscope according to the invention.

In a further exemplary embodiment of the microscope 12 and of the objective interchange apparatus 22, the holder 21 has no slide-in means 24 having guides 23, but the objectives 1 are anchored at the respective holder positions 21.n, for example suspended, as is illustrated schematically in FIG. 6. An objective 1 with the objective retainer 3, located at the transfer position ÜP, may be lifted out of the holder position 21.n using a swivel, in the form of a driver 17, which is arranged parallel to the optical beam path 13, and pivoted into the optical beam path 13. The objective 1 is here anchored in the objective receptacle 11, for example suspended. By way of this embodiment, the transport of the objective 1 is simplified with respect to horizontal displacement and does not require great precision in the delivery of transfer position ÜP to the objective receptacle 11 in the Z-direction Z.

In further possible embodiments, the objective retainer 3 is capable of being clamped by way of being pushed against stops 29 by the objective drive 16, said stops being arranged at a stand 30 or at a housing of the microscope 12. Such an embodiment allows for a separate clamping element drive 15 to be dispensed with and reduces the necessary control-technological outlay. However, the clamping must then be performed by way of mechanical spring elements, against which the objective drive 16 acts.

In further possible embodiments of the microscope 12, the objective retainer 3 is capable of being clamped by way of the object-side lateral face 3.2 against an object-side abutment surface 27 using the objective drive 16, as a result of which a position of the objective 1 and of the objective retainer 3 in the objective receptacle 11 can be referred for simplification purposes to only one reference surface 6.

In inverted stands, the setup at the XY-plane should be considered in mirrored fashion.

The above-mentioned possible embodiments and exemplary embodiments are combinable with one another within the scope of expert considerations.

The invention claimed is:

1. A microscope comprising:
    an objective receptacle;
    an objective interchange apparatus, the objective interchange apparatus including:
   a holder for receiving a plurality of objectives at respective holder positions, wherein each objective includes an objective retainer having an outer centering diameter as a reference surface and wherein the objective retainer of each objective has at least one planar support surface that extends orthogonally with respect to an optical axis of the objective when the objective is located in the objective receptacle, wherein the objective receptacle is configured for receiving an objective and is arranged in an optical beam path of the microscope;
        an objective delivery device configured for transporting a selected objective between the holder position of the selected objective and the objective receptacle; and
        a clamping apparatus configured for retaining the objective in a use position in the objective receptacle in a spatially fixed manner, wherein the clamping apparatus is formed by an abutment surface of the objective receptacle and at least one clamping element, wherein the objective retainer of the objective, when in the use position, is clampable by way of its planar support surface against the abutment surface by the clamping element, wherein the objective receptacle is configured to remain in the optical beam path during the transport of the objective, and wherein the objective retainer of the selected objective and the objective receptacle are configured such that the centering diameter of the objective retainer is guided against a lateral reference surface located in the objective receptacle, such that a reproducible positioning of the selected objective perpendicular to an optical axis of the microscope is achieved, and wherein the objective delivery device includes a driver and wherein the objective retainer includes a coupling region configured to releasably connect to the driver.

2. The microscope of claim 1, wherein the holder is configured to translate holder positions in a linear direction to at least one transfer position.

3. The microscope of claim 1, wherein the holder is configured to translate holder positions in a rotational direction to at least one transfer position.

4. The microscope of claim 3, wherein the holder is rotatable about an axis of rotation and the axis of rotation is inclined with respect to the optical beam path of the microscope.

5. The microscope of claim 1, wherein the objective retainer includes electrical contacts.

6. The microscope of claim 1, further comprising:

a stand configured as an upright or an inverted stand.

7. The microscope of claim 1, further comprising:

a stand configured for holding the selected objective in an orientation inclined with respect to the optical beam path of the microscope.

8. A microscope comprising:

an objective receptacle;

an objective interchange apparatus, the objective interchange apparatus including:

a holder for receiving a plurality of objectives at respective holder positions, wherein each objective includes an objective retainer having an outer centering diameter as a reference surface and wherein the objective retainer of each objective has at least one planar support surface that extends orthogonally with respect to an optical axis of the objective when the objective is located in the objective receptacle, wherein the objective receptacle is configured for receiving an objective and is arranged in an optical beam path of the microscope;

an objective delivery device configured for transporting a selected objective between the holder position of the selected objective and the objective receptacle; and a clamping apparatus configured for retaining the objective in a use position in the objective receptacle in a spatially fixed manner, wherein the clamping apparatus is formed by an abutment surface of the objective receptacle and at least one clamping element, wherein the objective retainer of the objective, when in the use position, is clampable by way of its planar support surface against the abutment surface by the clamping element, wherein the objective receptacle is configured to remain in the optical beam path during the transport of the objective, and wherein the objective retainer of the selected objective and the objective receptacle are configured such that the centering diameter of the objective retainer is guided against a lateral reference surface located in the objective receptacle, such that a reproducible positioning of the selected objective perpendicular to an optical axis of the microscope is achieved, and wherein the clamping element is connected to a clamping element drive and is movable in a controlled fashion in the direction of the optical beam path of the microscope using the clamping element drive.

9. The microscope of claim 8, wherein the objective delivery device includes a driver and wherein the objective retainer includes a coupling region configured to releasably connect to the driver.

10. The microscope of claim 8, wherein the holder is configured to translate holder positions in a linear direction to at least one transfer position.

11. The microscope of claim 8, wherein the holder is configured to translate holder positions in a rotational direction to at least one transfer position.

12. The microscope of claim 11, wherein the holder is rotatable about an axis of rotation and the axis of rotation is inclined with respect to the optical beam path of the microscope.

13. The microscope of claim 8, wherein the objective retainer includes electrical contacts.

14. The microscope of claim 8, further comprising:

a stand configured as an upright or an inverted stand.

15. The microscope of claim 8, further comprising:

a stand configured for holding the selected objective in an orientation inclined with respect to the optical beam path of the microscope.

* * * * *